United States Patent [19]

Curlett

[11] Patent Number: 4,614,160
[45] Date of Patent: Sep. 30, 1986

[54] PELLETIZED MATERIAL DEPOSITING TOOL

[75] Inventor: John Curlett, Watsonville, Calif.

[73] Assignee: Fort Dodge Chemical Company, Lompoc, Calif.

[21] Appl. No.: 668,545

[22] Filed: Nov. 5, 1984

[51] Int. Cl.[4] .............................................. A01C 5/02
[52] U.S. Cl. ................................................... 111/96
[58] Field of Search ....................... 111/92, 95, 93, 96, 111/7.1–7.4, 4, 89; 222/83.5

[56] References Cited

U.S. PATENT DOCUMENTS

| | | | |
|---|---|---|---|
| 1,890,391 | 12/1932 | Lane | 111/96 |
| 2,370,744 | 3/1945 | Molinare | 111/96 |
| 3,771,474 | 11/1973 | Elston | 111/96 |
| 3,799,081 | 3/1974 | Wilson | 111/96 X |
| 3,815,526 | 6/1974 | Christopherson | 111/7.2 |
| 4,246,854 | 1/1981 | Lempa | 111/96 |

FOREIGN PATENT DOCUMENTS

| | | | |
|---|---|---|---|
| 922987 | 4/1963 | United Kingdom | 111/96 |
| 1483549 | 8/1977 | United Kingdom | 111/92 |

*Primary Examiner*—James R. Feyrer
*Assistant Examiner*—Danton DeMille
*Attorney, Agent, or Firm*—Robert K. Rhea

[57] ABSTRACT

A manually operated dispensing tool for repeatedly dispensing a predetermined quantity of pelletized material below the surface of the earth. The tool includes an upright elongated outer housing adapted to be connected with a supply of pelletized material filling a reservoir formed by the outer housing. A spring biased downward sleeve having wall ports is vertically reciprocable in the depending end portion of the outer housing for communicating with the material reservoir. A drop tube of smaller diameter than the sleeve depends from and is secured at its upper end portion in the sleeve below the position of the sleeve ports. A handle assembly, overlying the top of the outer housing, is connected with a stem assembly projecting through the housing and drop tube. A central portion of the stem assembly forms a valve normally closing the upper end of the drop tube to define a measuring chamber in the sleeve communicating with the sleeve ports. The depending end of the stem assembly defines an earth penetrating tip normally closing the lower limit of the drop tube. Downward movement of the device into the surface of the earth moves the sleeve upwardly within the outer housing to uncover the sleeve ports and load the measuring chamber. Manually lifting the stem assembly relative to the housing releases the measured charge of pelletized material to fall by gravity through the drop tube.

6 Claims, 5 Drawing Figures

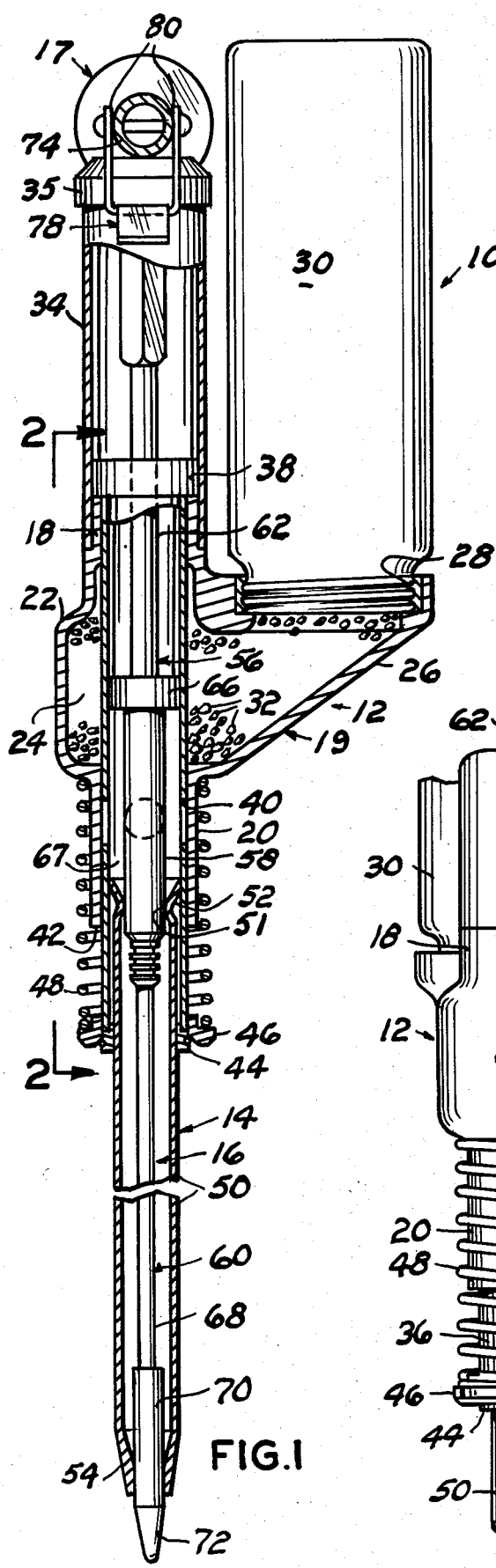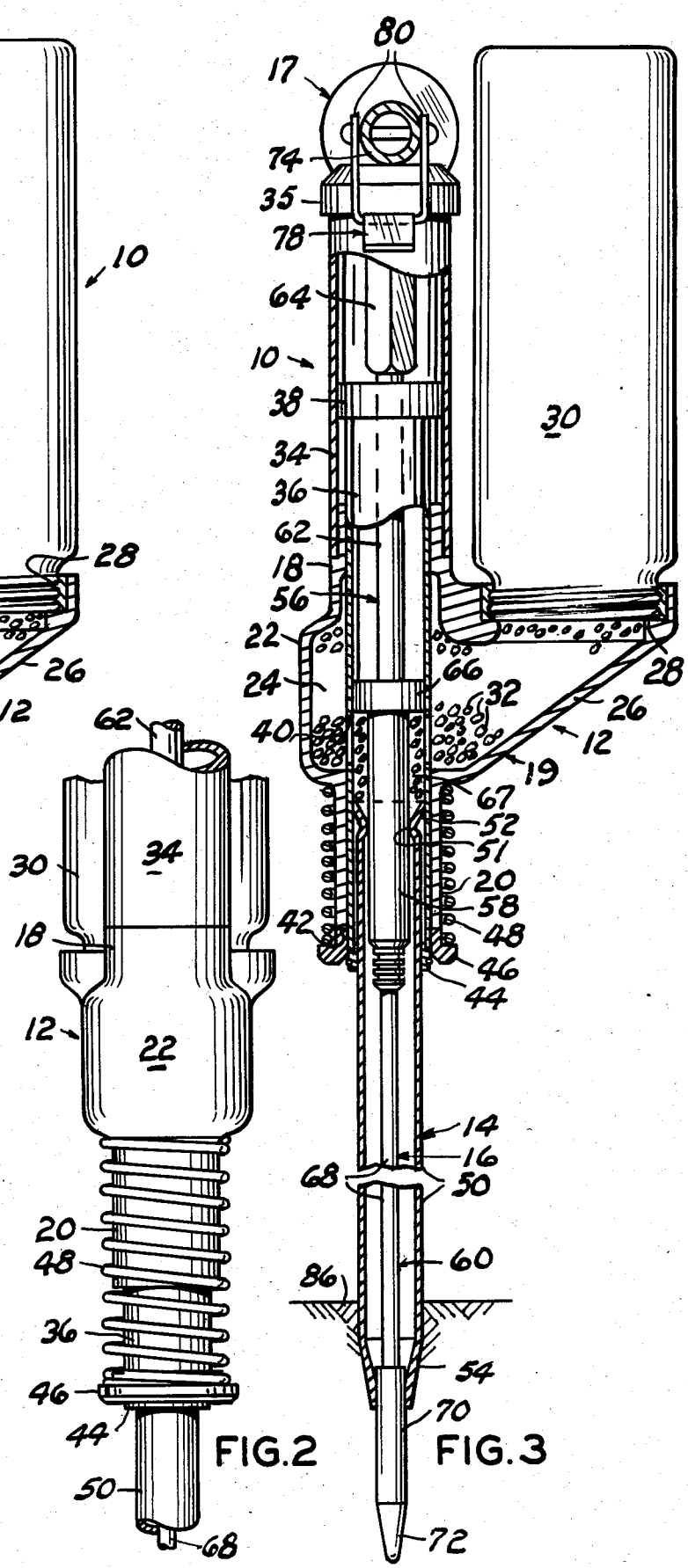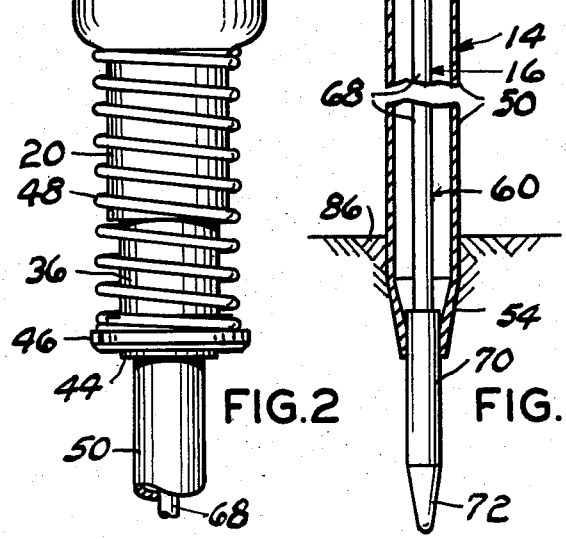

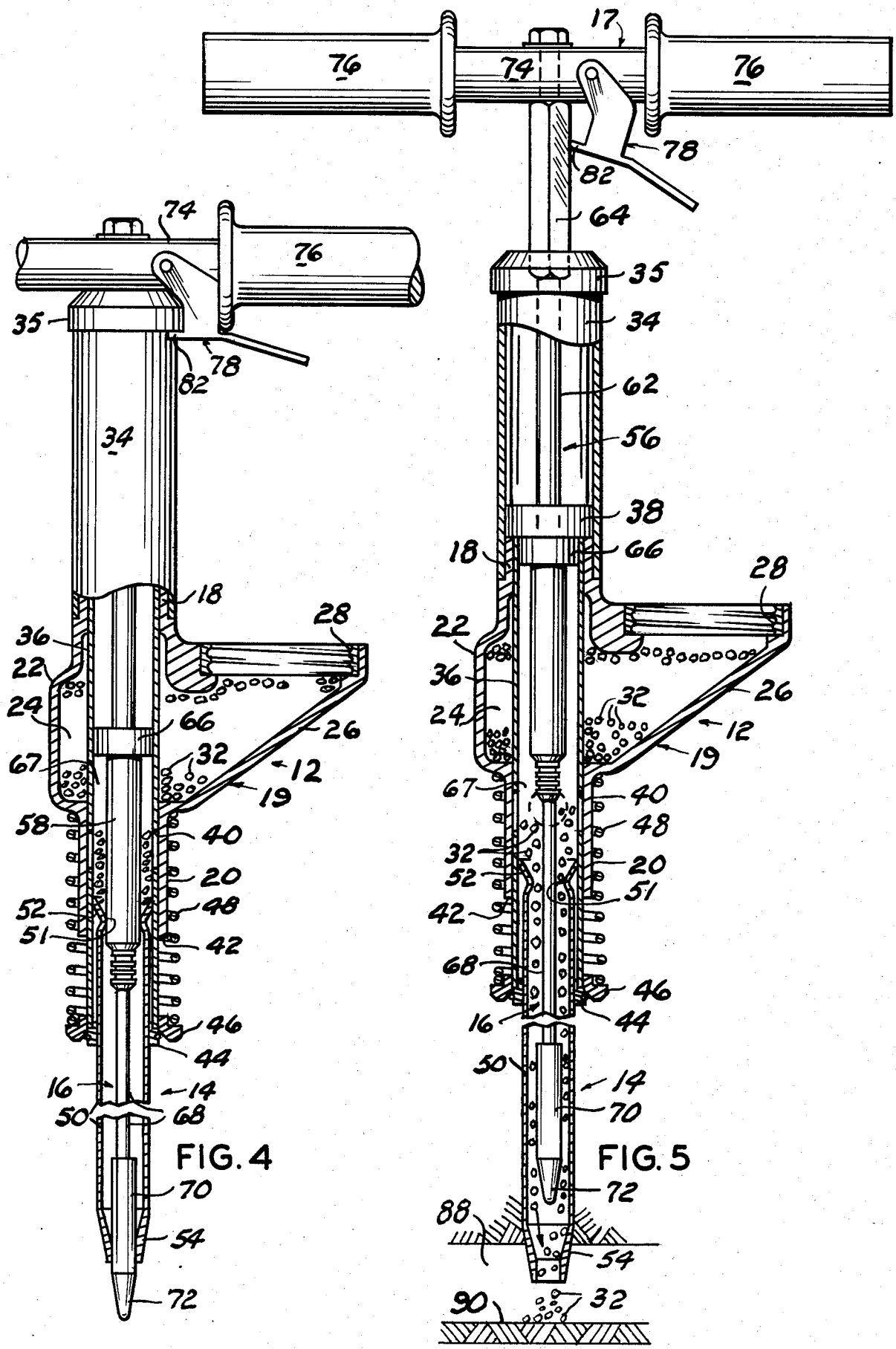

PELLETIZED MATERIAL DEPOSITING TOOL

BACKGROUND OF THE INVENTION

1. Field of the Invention.

The present invention relates to a manually operated tool for depositing grain or pelletized material below the surface of the earth.

2. Description of the Prior Art.

Prior patents generally disclose manually transported and operated tools of generally elongated cylindrical configuration for depositing pellets or pelletized material, such a fertilizer for trees, shrubs, or the like, or for depositing rodent poison, such as gopher poison, in gopher runs below the surface of the earth.

U.S. Pat. No. 2,370,744 is an example of a fertilizer dispenser which comprises an elongated upright cylindrical housing provided with a reduced diameter lower end portion containing a valve mechanism manually operated by a plunger coextensive with the length of the fertilizer containing housing. Downward movement of the housing forces its depending cone-shaped end portion into the surface of the earth against the force of the surrounding lift spring so that after the plunger has operated the valve to load the cone-shaped end with a charge of the fertilizer, the cone-shaped valve may be lifted by the plunger to deposit the charge of fertilizer in the conical hole formed in the surface of the earth.

U.S. Pat. No. 3,771,474 discloses an elongated cylindrical tool having a barrel with a reduced diameter lower end portion terminating in a cone-shape normally plugged by a valve cone member on the depending end of a plunger extending longitudinally through the barrel and connected at its upper end with a handle for manually reciprocating the plunger. A laterally projecting tube forms a poison containing chamber filled by a container overlying the lateral end of the tube which deposits a predetermined charge of poison in a measuring chamber normally disposed above an enlarged cylindrical portion of the plunger. The depending end of the barrel is manually forced into the earth to locate a gopher run and the handle and plunger are manually lifted relative to the housing to open the cone-shaped end and deposit the measured quantity of poison in the gopher run by upward movement of the plunger enlarged cylindrical portion moving through and lifting bait out of the measuring chamber to fall by gravity out of the lower barrel portion.

This invention is distinctive over these patents by forming the lower end portion of an earth penetrating housing as a separate piece moved upward with respect to a central stem, in response to downward movement of the housing into the earth. A portion of the stem projects out of the depending end of the earth engaging housing while a housing contained sliding sleeve simultaneously measures a predetermined quantity of bait or pellet material into a receiving chamber incapable, by the manner of construction, of receiving any additional material by repeated insertions of the tool into the surface of the earth before the initial charge in the measuring chamber has been discharged. This device is incapable of accidentally discharging any poisoned material when not in use thus providing a spill free safe handling tool.

SUMMARY OF THE INVENTION

The pellet dispensing device is generally upright cylindrical and includes three cooperating subassemblies, a housing assembly, a drop tube assembly and a stem assembly. A central housing forms a pellet material receiving reservoir having a lateral threaded throat for connection with a threaded supply bottle. The upper end of the housing is extended by a barrel portion having a top cap. A drop tube assembly includes a sleeve coaxially slidably received by the depending end of the housing and contains, at its depending end, a ground penetrating pellet drop tube which at its upper end forms, in combination with the sleeve, a measuring chamber filled from the material reservoir through apertures in the sleeve when the sleeve is moved upwardly relative to the housing during an earth penetrating action of the drop tube.

The stem assembly extends coaxially through the housing and drop tube assemblies and includes a penetrating tip normally disposed within and closing the depending end of the drop tube. The stem assembly is connected at its upper limit with a handle overlying the barrel cap. The stem assembly further includes a central enlarged valve portion normally closing the top of the drop tube. Manually lifting the stem assembly relative to the housing drop tube assembly releases the material to fall by gravity from the measured chamber through the drop tube.

The principal objects of this invention are to provide a pelletized material non-clogging dispensing device for depositing a predetermined quantity of the material in gopher runs when used in controlling pocket gophers; for depositing vegetation fertilizer in the soil in which a measured quantity of the material fills a drop tube chamber from a reservoir upon manually inserting one end of the device into the surface of the earth; will not release any material regardless of its physical attitude unless a full two stage cycle of operation is manually performed; will never release more than one measured charge with repeated operation of either stage of the cycle which prevents clogging by a buildup of more than one charge; and, prevents spilling any dangerous material during transport or careless handling prior to the release of the measured charge in response to manual movement of a release valve.

BRIEF DESCRIPTION OF THE DRAWINGS

FIG. 1 is a fragmentary vertical cross sectional view, partially in elevation, prior to filling the material dispensing chamber;

FIG. 2 is a fragmentary elevational view looking in the direction of the arrows 2—2 of FIG. 1;

FIG. 3 is a view similar to FIG. 1 illustrating the filling of the material dispensing chamber in response to inserting the drop tube into the earth;

FIG. 4 is a view similar to FIG. 1 with the material dispensing chamber filled and the reservoir supply bottle removed and the handle rotated 90° about the vertical axis of the device from the positions of FIGS. 1 and 3 for clarity; and, FIG. 5 is a fragmentary vertical cross sectional view, similar to FIG. 4, illustrating poison bait released to fall into a penetrated gopher run in response to manually lifting the handle and stem.

DESCRIPTION OF THE PREFERRED EMBODIMENT

Like characters of reference designate like parts in those figures of the drawings in which they occur.

In the drawings:

The reference numeral 10 indicates the device, as a whole, which is upright generally cylindrical in overall configuration and includes an outer housing assembly 12, a drop tube assembly 14, a stem assembly 16 and a handle assembly 17.

The housing assembly 12 comprises a casting 19 having axially aligned tubular end portions 18 and 20 and is diametrically enlarged intermediate these end portions, as at 22, to form a pellet material containing reservoir 24. The casting 19 is further provided with a lateral upwardly inclined throat portion 26 characterized by a horizontal upwardly open end portion having internal threads 28 for cooperatively receiving a reserve supply, such as a bottle 30 containing the pelletized material, such as timed release fertilizer or poison bait 32, to be dispensed as presently explained. The device 10 is preferably inverted from the position shown by the drawings to attach the bait filled bottle 30.

The housing end portion 18 is provided with a coaxial tubular barrel 34 having a centrally apertured top cap 35 for the purposes presently explained.

The drop tube assembly 14 includes upper and lower portions. The upper portion comprises a metering sleeve 36 projecting beyond the opposing end limits of the casting end portions 18 and 20 and slidably received at its respective end portions by the casting end portions 18 and 20. The upper end of the sleeve 36 is secured to a centrally bored cylindrical bushing 38 slidable in the barrel 34 and normally overlying the upper end limit of the casting upper end portion 18 to interrupt downward movement of the sleeve relative to the housing. Intermediate its ends, the sleeve is provided with a plurality of radially spaced ports or apertures 40. In the start or measuring chamber unloaded position, the sleeve apertures 40 are normally disposed within the casting end portion wall 20 and spaced downwardly with respect to the material 32 in the bait reservoir 24. The downward spacing of the apertures 40 with respect to the depending limit of the reservoir 24 is determined by the distance the sleeve 36 projects downwardly beyond the depending end limit 42 of the casting lower end portion 20. The depending end of the sleeve 36 is secured to an annular stop 44 normally engaged and biased downwardly by a spring ring seat 46. A helical expansion spring 48 surrounds the casting depending end portion 20 and protruding end of the sleeve 36 between the ring seat 46 and enlarged portion 22 of the casting.

The lower portion of the drop tube assembly includes a drop tube 50 of smaller diameter than the sleeve 36 which is surrounded by and is secured adjacent its upper end to the stop 44. The upper end portion of the drop tube 50 forms a valve seat 51 characterized by an outwardly flanged funnel-like top end portion 52 having a circumferential wall restriction for the circumference of the larger portion of its funnel shape contiguously contacting the bore of the sleeve 36. The depending end portion of the drop tube 50 defines a frustoconical end portion 54 for the purposes presently explained.

The stem assembly 16 comprises an upper rod assembly 56, axially connected with an intermediate stem portion 58 and a lower rod assembly 60 extending coaxially through the device 10. The upper rod assembly 56 comprises an elongated rod 62 having an upper guide portion 64 of polygonal transverse section of predetermined length and slidable in the top cap aperture for the purposes presently explained.

A cylindrical stem guide nut 66, slidably received by the inner wall of the sleeve 36, secures the depending end portion of the rod 62 to the upper end portion of the stem 58 above the upper limit of the sleeve apertures 40. The sleeve 36 is biased upwardly against the spring 48 in a ground penetrating action as presently explained.

Additionally, the purpose of the guide nut 66, in combination with the drop tube flanged end 52 and annulus between the sleeve inner wall and the stem portion 58, is to define the upper limit of a metering or measuring chamber 67 for limiting the quantity of material 32 entering the chamber 67 during its filling action. The stem portion 58 forms a valve and its diameter is such that it is slidably received closely by the valve seat forming throat of the drop tube funnel-shaped upper end portion 52 so that the material 32 will be maintained in the chamber 67 until released as presently explained.

The lower rod assembly 60 includes a rod 68 axially connected at its depending end with a cylindrical earth penetrator 70 having its periphery slidably received by the drop tube conical end portion 54 and normally projecting at its depending end beyond the lower limit of the drop tube. The depending end of the penetrator 70 is inverted cone-shaped, as at 72, for ease in forcing the penetrator into the surface of the earth.

The handle assembly 17 comprises a horizontally disposed handle 74 of selected length which is centrally secured to the upper limit of the stem guide portion 64 and provided with suitable hand grips 76. A generally U-shaped inverted clip member 78 is pivotally connected by its legs 80 to the handle 74 so that a lip portion 82 of the clip normally underlies a depending edge of the cap 35 and holds the stem assembly in the downward locked position of FIG. 4. The clip 78 may be manually lifted out of engagement with the cap to permit upward movement of the handle and stem assembly relative to the outer housing and drop tube assembly as presently explained.

OPERATION

Basically the device 10 has two separate sliding operations which respectively measures and releases the bait, one being downward movement of the housing assembly 12 relative to the drop tube assembly 14 in response to manual force on the handle assembly 17 which fills the measured charge chamber 67 from the reservoir 24, the other sliding operation being manual release of the stem assembly 16 to move its valve portion 58 upwardly out of the valve seat 51 and lift the penetrating tip 70 above the cone-shaped end portion 54 to permit the material 32 to fall by gravity out of the drop tube 50, as illustrated by FIG. 5.

In operation, it is assumed the supply bottle 30 has been mounted on the casting and the reservoir 24 filled. The device is held by its handle grips 76 and the drop tube 50 forced into the surface of the earth 86. Since the penetrator 70 is of relatively small diameter it normally easily enters the earth and the larger diameter of the tube 50 will cause it to be forced upwardly relative to the stem assembly 16 by the resistance of the soil and collapsing the spring 48 until the spring ring 46 contacts the casting end surface 42. This action moves the sleeve 36 upwardly in the outer housing until its apertures or ports 40 are open to the reservoir 24. The material 32 then flows by gravity into the chamber 67, as illustrated by FIG. 3. Only this spring loaded stroke will fill the chamber 67 with pellet material for discharge from the tool.

In the event a gopher run is not located by this earth penetration, the drop tube and penetrator tip are withdrawn from the soil and the charge of bait 32 remains in the chamber 67 while the spring 48 expands and moves the sleeve 36 and drop tube 50 downward with respect to the outer housing thus again covering the sleeve apertures or ports 40, as illustrated by FIG. 4. Repeated insertion of the drop tube and penetrator tip into the soil in attempts to locate a gopher run repositions the components in the position illustrated by FIG. 3 but no additional bait enters the chamber 67 since the chamber 67 remains filled by the first probing operation.

When a gopher run 88 is penetrated by the drop tube and penetrator tip, the entire tool is lifted a short distance to insure that the depending end of the drop tube is in spaced relation with respect to the bottom surface 90 of the gopher run. This also permits the spring 48 to position the sleeve and drop tube 50 in their downward sleeve port covered positions with respect to the outer housing 12.

The handle latch 78 is then manually released from the barrel cap 35 permitting the stem assembly 16 to be moved upwardly relative the housing and drop tube assembly, such upward movement being limited by the guide nut 66 contacting the bushing 38. This movement lifts the valve 58 out of the drop tube flared end throat and lifts the penetrator tip 70 out of the drop tube conical portion 54, as illustrated by FIG. 5, so that all bait material 32 is free to fall by gravity from the chamber 67 and through the drop tube 50 into the gopher run. At this point the housing barrel 34 is preferably held by one hand and the stem assembly manually reciprocated vertically to insure the release of any grains or particles of the material 32 which might cling to the inner wall surface of the sleeve or drop tube. No additional material will fall from the reservoir 24 during this action for the reason the spring 48 maintains the sleeve 36 in its downward aperture or port closed position. After lowering the stem assembly into the housing and drop tube and fastening the latch 78 the device is ready for another cycle of operation.

When using the tool for depositing fertilizer in the soil an identical sequence of operations is performed.

Obviously the invention is susceptible to changes or alterations without defeating its practicability. Therefore, I do not wish to be confined to the preferred embodiment shown in the drawings and described herein.

I claim:

1. A pellet measured charge dispensing probe, comprising:

elongated housing means having a pellet passageway and a pellet reservoir;

earth penetrating drop tube means including a metering sleeve depending from said housing means for forming a pellet measuring chamber and telescoping at one end portion into the pellet passageway of said housing means in response to manually induced downward axial movement of the probe and intersecting the pellet reservoir and said metering sleeve having a wall port communicating with the reservoir when telescoped inwardly independently of any pellet dispensing action;

a valve seat forming restriction in the wall of said drop tube means adjacent one side of the port;

resilient means for normally biasing said metering sleeve toward a wall port closed telescopically extended position;

stem means extending through the housing and drop tube means and normally closing the drop tube means and including a valve normally seated on said valve seat for closing the drop tube means and defining the downward end limit of the pellet measuring chamber;

a stem guide on the stem means adjacent the other side of the port and cooperating with said valve for defining the upward end limit of the pellet measuring chamber; and, handle means on said stem means above said housing means for axially moving said stem means relative to the housing means and metering sleeve and unseating said valve.

2. A pellet measured charge dispenser, comprising;

tubular housing means adapted to contain a supply of pellets to be dispensed;

drop tube means including a metering sleeve telescoping into the housing means and having a wall port communicating with the supply of pellets for receiving and containing a measured single charge of pellets when the sleeve means is telescoped into said housing means independently of any pellet dispensing action;

resilient means normally biasing said drop tube toward a telescopically extended position;

a valve seat within the depending portion of said metering sleeve below its wall port;

stem means including a rod axially extending through and moveable relative to said drop tube means and housing means;

a valve on said rod normally seated on the valve seat for containing the pellet charge;

a stem means guide on said rod above said valve for closing the bore of the metering sleeve and defining the upper limit of the measured charge;

a soil penetrating tip on the depending end of said rod for normally closing the depending end of said drop tube means; and, handle means on said rod for vertically reciprocating said stem means relative to said metering sleeve and unseating said valve for releasing the previously measured pellet charge.

3. A pellet measured charge dispensing probe, comprising:

elongated housing means having an axial passageway and having an enlarged portion intermediate its ends forming a pellet material reservoir having a lateral throat terminating in an upwardly facing opening;

pellet supply bottle means operatively connected with the throat opening for filling the reservoir;

upper drop tube means including a metering sleeve vertically slidable at one end portion within said housing means for defining the outer perimeter of a pellet single charge measuring chamber, said sleeve having a wall port communicating with the reservoir when said sleeve is in an upper position;

lower drop tube means adapted to be manually forced into the surface of the earth to lift said sleeve to a port open position including a drop tube secured to and depending from said sleeve for forming a continuation of the axial passageway;

a valve seat adjacent the upper end of said drop tube for defining the lower limit of the measuring chamber;

resilient means for normally biasing said upper and lower drop tube means as a unit toward a sleeve port closed position;

stem means including a rod extending through the passageway and respective ends of said probe and including a valve and a soil penetrating tip on said rod and respectively normally closing the valve seat and depending end of said lowerdrop tube; and, handle means overlying said housing means and secured to said rod for lifting said stem means relative to the housing and upper and lower drop tube means and simultaneously unseating said valve and opening the depending end of said lower drop tube, whereby the measuring chamber entry ports remain closed while a previously measured charge of pellets falls by gravity out of said probe.

4. The probe according to claim 3 in which said handle means includes:

latch means normally connecting said handle means with said housing means for maintaining said valve seated and the depending end of said drop tube closed.

5. The probe according to claim 4 and further including:

bushing means secured to said sleeve above the reservoir for preventing downward movement of said sleeve out of the housing.

6. The probe according to claim 5 and further including:

guide nut means on said valve for defining the upper limit of the measuring chamber and limiting upward movement of said stem means relative to the housing means beyond a valve and drop tube open position.

* * * * *